Sept. 20, 1932.   T. J. FLACK   1,878,689
WEED CUTTER
Filed July 2, 1929
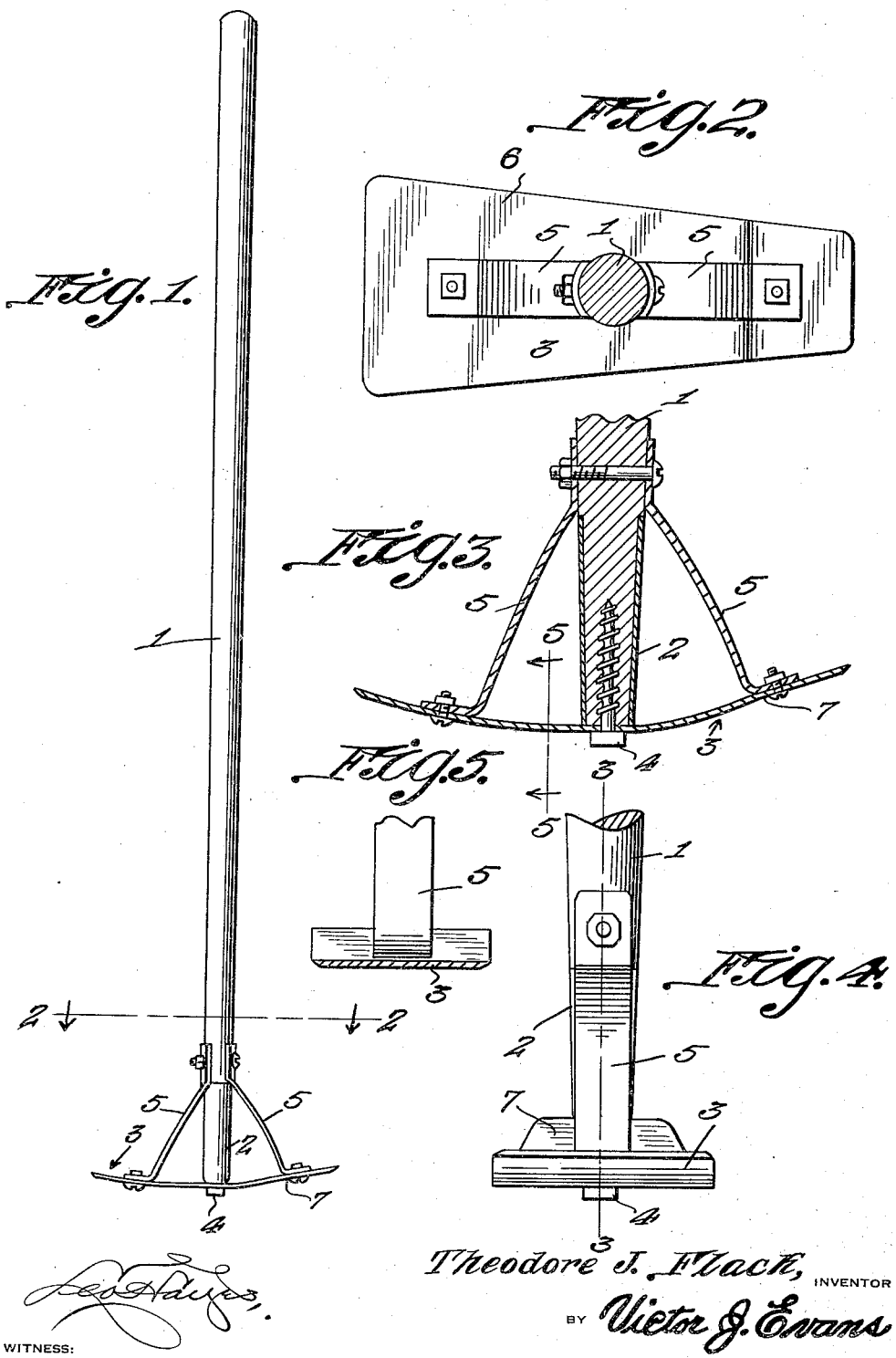
Theodore J. Flack, INVENTOR
BY Victor J. Evans
ATTORNEY
WITNESS:

Patented Sept. 20, 1932

1,878,689

UNITED STATES PATENT OFFICE

THEODORE J. FLACK, OF BROOKSVILLE, FLORIDA

WEED CUTTER

Application filed July 2, 1929. Serial No. 375,461.

This invention relates to a weed cutter, the general object of the invention being to provide a handle having a transversely extending blade connected with one end of the handle, with its side edge sharpened so that as the device is swung, an edge of the blade will act to cut weeds and the like so that the device is used similar to a broom and enables one to cut the weeds with very little effort and without stooping.

Another object of the invention is to provide one end of the blade with a curved upper portion so that when this end is placed toward the user, there is no danger of this part of the blade striking the ground.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation of the device.

Figure 2 is a section on line 2—2 of Figure 1.

Figure 3 is a section on line 3—3 of Figure 4.

Figure 4 is a view looking toward one end of the blade.

Figure 5 is a section on line 5—5 of Figure 3.

In these views, the numeral 1 indicates the handle of the device and 2 indicates a ferrule placed on the tapered end of the handle, the numeral 3 indicating a blade which has its central part connected with the tapered end of the handle by a screw bolt 4. Braces 5 connect the handle with portions of the blade adjacent the ends of the blade. The blade tapers from one end to the other so that its side edges are diagonally arranged and these side edges are beveled, as at 6, to form cutting edges. The small end part of the blade is curved upwardly, as shown at 7, so that when the device is in use and this small end placed toward the user, it will not engage the ground. The other end part may be slightly curved as shown, though this part may be made straight, if desired.

As before stated, the device is held in a substantially vertical position and swung back and forth so that its side edges will cut weeds and the like so that the weeds can be cut with very little effort and without the user stooping as he would by using a scythe. The device is used somewhat similar to a broom. By making the side edges inclined, the cutting action is increased, as will be understood, and by placing the turned-up part 7 toward the user, there is no danger of the blade striking the ground when the device is in use. If desired, the end edges of the blade can be sharpened so that the device can be used as a hoe.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A weed cutter comprising a handle, a blade tapering from one end to the other and having its central portion connected with one end of the handle, said blade having its side edges beveled to form cutting edges and said blade curving upwardly from its center to each end, one-half of the blade curving upwardly to a greater extent than the other half, and braces connecting the handle with the blade adjacent the ends of the blade.

In testimony whereof I affix my signature.

THEODORE J. FLACK.